F. M. RAY.
Car Wheel.
No. 4,894.
Patented Dec. 17, 1846.
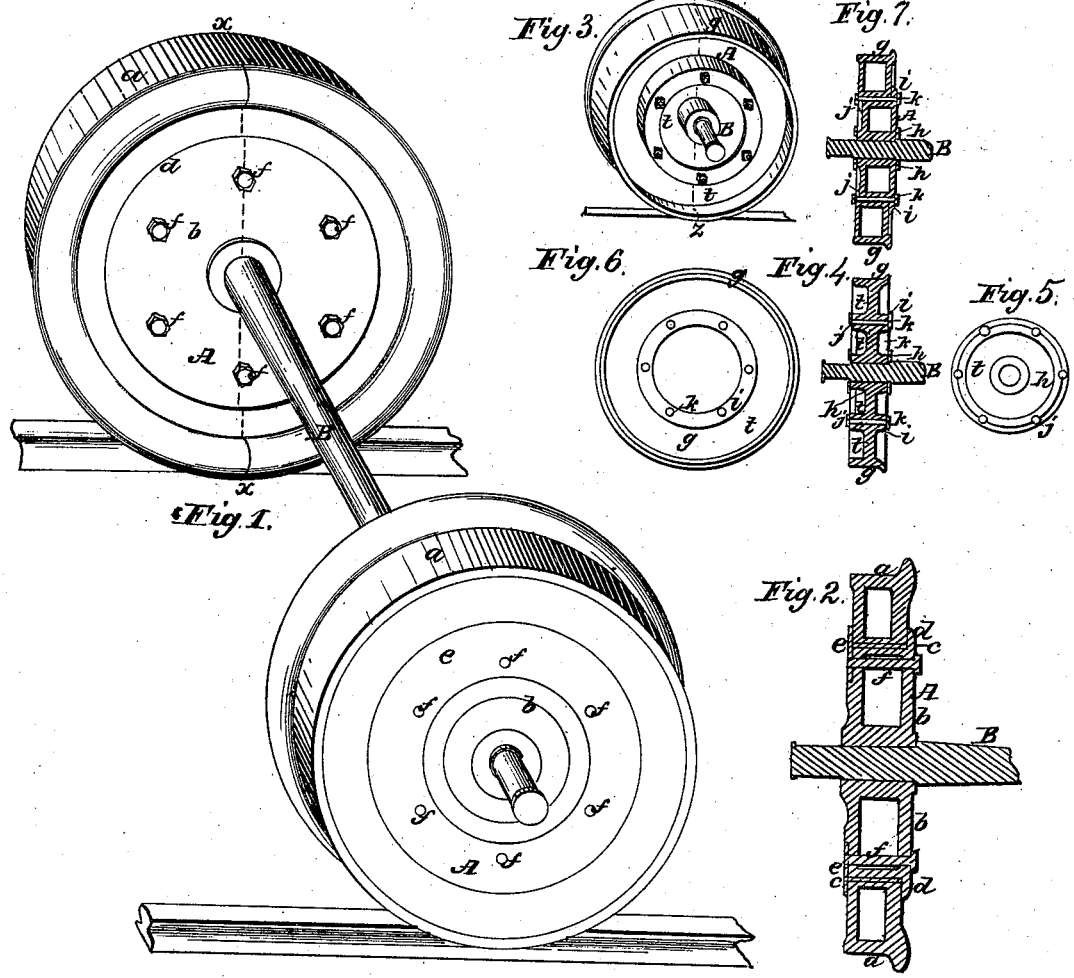

UNITED STATES PATENT OFFICE.

FOWLER M. RAY, OF NEW YORK, N. Y.

CAR-WHEEL.

Specification of Letters Patent No. 4,894, dated December 17, 1846.

*To all whom it may concern:*

Be it known that I, FOWLER M. RAY, of the city, county, and State of New York, have invented a new and Improved Mode of Making Wheels for Railroad-Trucks, &c., and that the following is a full, clear, and exact description of the principle or character which distinguishes it from all other things before known and of the manner of making, constructing, and using the same, reference being had to the accompanying drawings, making part of this specification, in which—

Figure 1 is a view of an axle and two wheels placed upon a rail way, drawn in perspective to show an inside and outside view of the wheels. Fig. 2 is a sectional view of the wheel taken at the line (X X) of Fig. 1; Fig. 3 is a perspective view drawn upon a scale half less than the preceding figures showing a form of a wheel, modified in some respects to that represented at Figs. 1 and 2. Fig. 4 is a sectional view parallel with its axis of Fig. 3 and taken at the line (Z Z). Fig. 5 is a front elevation of the center or hub part of the wheel represented at Fig. 3. Fig. 6 is a like elevation of the rim part of the wheel, and Fig. 7 represents a section of a wheel differing in nothing from the one shown at Fig. 3 except as it relates to a different plan of the metal composing the wheel.

The nature of my invention consists in making rail road wheels in two parts, the inner one constituting a hub fitting within the other with a layer of leather or other elastic substance interposed to act as a cushion in deadening the concussions to which rail road wheels are exposed, the two parts of the wheel being secured together between radial flanges.

In the accompanying drawings (A) represents the wheel with the inner or hub part (*b*) firmly, and in the usual uanner, secured to the axle (B). The periphery of this part is cylindrical or nearly so to receive a belt or leather (*c*) on which is fitted the outer portion (*a*) of the wheel that rests against a flange (*d*) that projects beyond the periphery of the hub (*b*) and then the whole is secured by a flange plate or annulus (*e*) that lies against the face of the two parts and secured by bolts (*f*) that pass through the hub so that the outer portion of the wheel can turn on the hub whenever the two wheels travel on circles of different diameter. Or the wheel can be put together as represented in Figs. 3, 4, 5, and 6, in which it will be seen that the hub (*h*) is cast with a flange (*i*) similar to the flange (*d*) in Figs. 1 and 2. And the outer portion (*g*) with a like flange (*j*) so that when the two parts of the wheel are slipped onto each other they are secured by bolts (*k*) that pass through the flanges in lines parallel with the axis of the wheel, and at the junction of the two parts of the wheel. In this modification instead of casting the body of the main parts of the wheel hollow, the rim is connected by casting with the part that fits on the hub by means of a web (*t*), and that part of the hub which fits within the outer portion of the wheel is in like manner connected with that portion which is attached to the axle. Fig. 7 represents this same modification of the mode of attachment with the hub and outer portion of the wheel cast hollow, as in the first example.

In the two latter modifications securing bolts are let into the outer periphery of the hub and the inner periphery of the outer portion of the wheel which will prevent the two parts of the wheel from turning on each other. If desired an elastic medium, such as leather may be interposed between the flanges and the surfaces fitting against them; but with or without this it will be seen that by means of the bolts and the flanges the two parts of the wheel can be connected and held together in the most firm and permanent manner, and at the same time present all the advantages of casting the hub and outer portion separately which will admit of chilling the tread and flange without rendering the other portions liable to break by the sudden contraction of the metal. But one of the leading advantages of this mode of construction and union of the parts is the insertion of the leather cushion or other elastic medium between the hub and rim in such manner as to admit of replacing it when by repeated concussions it shall have lost its elasticity or become loose.

What I claim as my invention and desire to secure by Letters Patent is—

Making rail road wheels in two parts fitted together substantially as herein described, when embraced and held together by flanges and screw bolts passing through the flanges, in manner and for the purpose substantially as herein described. And I also claim in combination with this method of constructing and connecting the two parts of rail road wheels, interposing the cushion of leather or other elastic substance between the inner and outer portions of the wheel, substantially as described, whereby rail road cars, &c., are relieved of a portion of the jar consequent on the striking of the wheels against the rails, as set forth.

F. M. RAY.

Witnesses:
  A. P. HAWLEY,
  F. M. UPHAM.